US006117563A

United States Patent [19]

Watanabe et al.

[11] Patent Number: 6,117,563

[45] Date of Patent: Sep. 12, 2000

[54] MOISTUREPROOF PAPER HAVING SHADING PROPERTY AND RECYCLABILITY

[75] Inventors: Mituyuki Watanabe; Akiko Doujo; Ryoji Ito; Tsutomu Fujigamori; Kiyotaka Kido; Yuji Otake, all of Tokyo, Japan

[73] Assignees: Nippon Paper Industries Co., Ltd.; Toyo Ink Manufacturing Co., Ltd.; San-Mic Chiyoda Co., Ltd., all of Tokyo, Japan

[21] Appl. No.: 09/000,493

[22] PCT Filed: Oct. 7, 1996

[86] PCT No.: PCT/JP96/02911

§ 371 Date: Feb. 9, 1998

§ 102(e) Date: Feb. 9, 1998

[87] PCT Pub. No.: WO97/14848

PCT Pub. Date: Apr. 24, 1997

[30] Foreign Application Priority Data

Oct. 18, 1995 [JP] Japan .................................... 7-293823

[51] Int. Cl.[7] ..................................................... B32B 29/00

[52] U.S. Cl. .................. 428/537.5; 428/342; 428/488.1; 428/507

[58] Field of Search .................................... 428/484, 486, 428/488.1, 537.5, 342, 507

[56] References Cited

FOREIGN PATENT DOCUMENTS 7-082691 3/1995 Japan ............................. B65D 65/16

*Primary Examiner*—Bruce H. Hess
*Assistant Examiner*—Michael E. Grendzynski
*Attorney, Agent, or Firm*—Oblon, Spivak, McClelland, Maier & Neustadt, P.C.

[57] ABSTRACT

The object is to provide a moistureproof paper which is excellent in light-screening, moisture-proof, waterproof and heat-sealing properties and regeneration property at the time of reuse as a used paper, and in order to attain the object, a moisture-proof layer (3) of maceration, regeneration and heat-sealing properties is provided on the surface of a coated base (1) having a light-screening layer (2) of a hue of from 25 to 70 in terms of the luminosity index L* to obtain a moisture-proof paper having a light-screening and regeneration properties.

6 Claims, 1 Drawing Sheet

MOISTUREPROOF PAPER HAVING SHADING PROPERTY AND RECYCLABILITY

FIELD OF THE TECHNOLOGY

The present invention relates to a moistureproof paper which is used for wrapping papers of light-sensitive materials, heat-sensitive recording papers, photographic printing papers, and the like. In particular, relates to a moistureproof paper which is not only extremely excellent in defibration properties and reusing properties as recycling properties of waste papers, and heat-sealing properties, but also has light-proofing properties.

BACKGROUND OF THE TECHNOLOGY

As moistureproof papers, tarpaulin papers and wax papers were formerly known. At present, papers having a high-molecular weight compound, such as polyethylene, polypropylene and polyvinyl chloride, coated or laminated thereon to impart moistureproof and waterproof properties are generally used. However, while the above-described moistureproof papers could thoroughly exhibit the function with respect to the moistureproof properties, they were extremely poor in defibration properties at the time of collection and reuse as a waste paper were difficult. For this reason, a big problem still remained from the view-points of saving of natural resources, effective use, and the like.

As papers which solve the above-described defects and are superior in moistureproof and waterproof properties and defibration properties as waste papers and processes for producing the same, those using a wax-based emulsion alone or a mixed solution of a wax-based emulsion with a synthetic rubber-based latex (refer to the official gazette of Patent Publication No. 3-10759), those using a mixed solution of an acrylic emulsion with a wax-based emulsion (refer to the official gazette of Patent Publication No. 2-1671 and the official gazette of Patent Application Laid-Open No. 6-200498), and the like are known. However, while the moistureproof and waterproof papers produced by each of these processes provided a capacity comparable to the existing moistureproof papers with respect to the moistureproof and waterproof properties, they were not satisfactory in obtaining other necessary qualities.

For example, moistureproof papers obtained by coating a wax-based emulsion involved such defects that they cause a reduction in the coefficient of friction, they are very inferior in moistureproof properties when folded, and that when they are reused waste-paper stock, a large amount of the wax contained in the waste-paper stock adheres to rolls and the like of a paper machine to generate roll stains, whereby the recycling properties are greatly deteriorated. The moistureproof papers produced by coating a mixture of a synthetic rubber-based latex with a wax-based emulsion as disclosed in the official gazette of Patent Publication No. 3-10759 were very inferior in the heat-sealing capacity which is required for sealing and further not satisfactory yet in the defibration properties as the collection properties of waste papers. Further, inferiority in the heat-sealing capacity entails use of gummed tapes or adhesives such as those using vinyl acetate for sealing of wrapping papers. For this reason, the tape or adhesive adheres to the moistureproof paper sealed by such materials and adversely affects the defibration properties at the time of recycling, resulting in a big obstacle for the reuse from the standpoint of practical use.

In addition, the moistureproof papers produced by coating a mixture of an acrylic emulsion with a wax-based emulsion as disclosed in the official gazette of Patent Publication No. 2-1671 and the official gazette of Patent Application Laid-Open No. 6-200498 involved the following defects. In the official gazette of Patent Publication No. 2-1671, the heat-sealing properties and defibration properties are not at all mentioned. Also, the amount of the wax-based emulsion used was so high as from 90:10 to 50:50, (preferably 70:30 to 60:40) in terms of a mixing ratio of the acrylic resin to the wax as a solids content, resulting in a reduction in the coefficient of friction of moistureproof papers, and the paper-making properties were not yet satisfactory at the time of collection as waste papers for reuse. Thus, the moistureproof papers produced in this patent were not practically useful. Further, in the official gazette of Patent Application Laid-Open No. 6-200498, while the heat-sealing properties were good, the amount of the wax-based emulsion used was so high as in the case of above mentioned from 100:30 to 100:60 in terms of a mixing ratio of the acrylic resin to the wax as a solids content, resulting in a reduction of the coefficient of friction of moistureproof papers, and the defibration properties and paper-making properties were not satisfactory.

On the other hand, as moistureproof papers having light-proofing properties, moistureproof papers produced by laminating an aluminum foil and a polyolefin-based resin on a base paper, those produced by laminating a polyolefin-based resin containing a carbon black on a base paper, those produced by laminating a polyolefin-based resin on a black base paper which is prepared by subjecting a paper to paper making with carbon black, etc. have hitherto been used. However, any of these moistureproof papers were extremely poor in the defibration properties at the time of collection as waste papers for reuse, could not be reused, and had to be disposed by burning or reclamation as industrial wastes.

As papers which solve the above-described defects and are superior in light-proofing properties, moistureproof properties, and the defibration properties and processes for producing the same, those coating a mixed solution of an acrylic emulsion with a wax-based emulsion on the surface of a base paper prepared by subjecting a paper to paper making with an inorganic pigment such as carbon black, or of a base paper having a coated layer of an inorganic pigment such as carbon black or a metallized layer of an aluminum paste or the like provided thereon (refer to the official gazette of Patent Application Laid-Open No. 6-184987), those provided with a light-proofing layer containing an inorganic pigment such as carbon black and an aluminum paste as a major component, and a moistureproof layer containing an acrylic emulsion and a wax-based emulsion on a paper support (refer to the official gazette of Patent Application Laid-Open No. 7-82691), etc. are known. However, while the moistureproof papers having light-proofing properties produced by each of these processes provided the defibration properties for separating the base paper in a fibrous state, they were not satisfactory in the paper-making properties at the time of collection as waste papers for reuse and hence, were not practically useful.

For example, in those using carbon black, the carbon black can not be removed without using a deinking step. Accordingly, for example, in general manufacturers of corrugated papers having no deinking step, the carbon black standed out on the surface of a recycled paper, which resulted in a reduction of the commercial value of the recycled paper and made it impossible for practical reuse. Also, in those using an aluminum paste, the aluminum powder can not be removed even in the deinking step. Accordingly, the aluminum powder was mingled into a recycled paper so that the recycled paper could not be practically used.

Further, with respect to the mixture of an acrylic emulsion with a wax-based emulsion which is used for the purpose of imparting moistureproof properties, the amount of the wax-based emulsion used is so high as from 100:30 to 60 as disclosed in the invention of the official gazette of Patent Application Laid-Open No. 6-184987 and from 40:60 to 90:10 as disclosed in the invention of the official gazette of Patent Application Laid-Open No. 7-82691, respectively in terms of a mixing ratio of the acrylic resin to the wax-based emulsion as a solids content. Thus, roll stains were likely generated at the time of reuse of waste papers, and the recycling properties were not satisfactory yet.

Moreover, in those using carbon black, the surfaces thereof are so black that it is impossible to undergo printing or letter printing. Accordingly, in order to improve the printability, it was necessary to undergo whitening processing, processing of laminating a printable paper, or the like.

Incidentally, as papers which solve the above-described defects and are superior in the light-proofing properties, the moistureproof properties, and the recycling properties and processes for producing the same, those provided with a light-proofing layer containing a yellow pigment such as Benzidine Yellow and the like as major components and a moistureproof layer containing a synthetic rubber-based latex or a resin-based latex and a wax-based emulsion on a paper support (refer to the official gazette of Patent Application Laid-Open No. 7-1676) are known. However, the light-proofing properties obtained by this process were limited to from 250 to 500 nm in terms of the light-sensitive wavelength of diazo light-sensitive materials necessary as a wrapping material of presensitized (PS) printing plates but did not screen lights in a wide wavelength region ranging from ultraviolet rays to infrared rays as seen in an aluminum foil and carbon black.

THE PROBLEMS TO BE SOLVED BY THE INVENTION

Under such circumstances of the problems of the conventional techniques, the present invention has been made. That is, the present invention is to provide a moistureproof paper which not only has superior light-proofing properties, moistureproof properties, and heat-sealing properties but also is imparted with defibration properties as collection properties of waste papers and recycling properties at the time of reuse, without using aluminum, carbon black, or plastic films.

DISCLOSURE OF THE INVENTION

In the present invention, the above-described capacities are obtained by providing a light-proofing layer which is obtained by coating a mixed coating color of a light-proofing agent containing graphite, a color pigment, and a white pigment as major components and an aqueous binder (preferably in a mixing ratio of the light-proofing agent to the binder ranging from 100:5 to 100:300 as a solids content) on the surface of a paper, followed by drying and a moistureproof layer which is obtained by coating a mixed coating color of an acrylic emulsion (preferably having a gel fraction <<a degree of crosslinking in the emulsion grains>> ranging from 90 to 100%) and a wax-based emulsion (preferably in a mixing ratio of the acrylic emulsion to the wax ranging from 100:1 to 100:5 as a solid content), followed by drying, the moistureproof layer having defibration properties and heat-sealing properties after coating and drying.

With respect to the light-proofing properties required in the present invention, it is indispensable that the light transmittance is 0.5% or less over the whole wavelength region ranging from 200 to 800 nm. The moistureproof paper having such properties has light-proofing properties comparable to the conventionally used ones such as those produced by laminating an aluminum foil and a polyolefin-based resin on a base paper, those produced by laminating a polyolefin-based resin containing carbon black on a base paper, and those produced by laminating a polyolefin-based resin on a black base paper which is prepared by subjecting a paper to paper making with carbon black and can wrap and store light-sensitive materials, heat-sensitive recording papers, photographic printing papers, and the like without reducing their qualities over a long period of time.

Further more, in the present invention, for the purpose of making it possible to undergo printing or letter printing on not only the coated base paper surface but also the light-proofing layer surface from the viewpoint of printability or-letter printability, for the purpose of making the hue of recycled papers at the time of defibration as waste papers and paper-making close to that of the general kraft papers not so as to deteriorate the apparent commercial value from the viewpoint of recycling properties, and for the purpose of proofing lights in a wide wavelength region ranging from ultraviolet rays to infrared rays as in aluminum foils and carbon black from the viewpoint of light-proofing properties, it is indispensable that in the hue of the light-proofing layer surface, the luminosity index L* is from 25 to 70. If the luminosity index L* is less than 25, the light-proofing layer surface is substantially black so that not only it is impossible to undergo printing or letter printing on the light-proofing layer surface, but also the hue of the recycled papers is darkened as compared with the hue of the general kraft papers, whereby the appearance commercial value is deteriorated. If the luminosity index L* exceeds 70, the light-proofing properties are inferior, the light-proofing properties according to the coating weight can not be obtained so that the cost is high. The luminosity index L* is particularly preferable between 25 and 55.

STATE OF EMBODIMENT OF THE INVENTION

The light-proofing agent as referred to in the present invention contains a blend of from 2 to 50% by weight of graphite, from 10 to 70% by weight of a color pigment, and from 10 to 70% by weight of a white pigment as a pigment component, which is dispersed in water using a dispersing agent such as water-soluble resins and surfactants. The light-proofing agent of the present invention is comprised of from 40 to 80% by weight of the pigment component, from 3 to 10% by weight of the dispersing agent (as a solids content), and from 10 to 60% by weight of water. That is, when the light-proofing agent containing such pigments as major components in the above-described compounding ratio is used for the light-proofing layer, a light-proofing layer having satisfactory light-proofing properties and a hue in which the luminosity index L* is from 25 to 70 is obtained. Further, since it is not necessary to use dyes, etc. in order to adjust the hue, the waste water disposal in the production step of recycled papers is easy.

With respect to the hue of the light-proofing layer to be provided in the present invention, the luminosity index L* can be adjusted by methods such as changing the compounding ratio of the graphite to the color pigment to the white pigment present in the light-proofing agent and changing the compounding ratio of the light-proofing agent to the aqueous high-molecular weight compound. Further, with respect to the hue of the light-proofing layer, although the chromaticity indices a* and b* are not particularly limited, in order to make the hue of the recycled papers closer to the hue of the general kraft papers, it is preferred that a* is from 1 to 25 and that b* is from 1 to 45.

As the graphite to be used for the light-proofing layer of to the present invention, flake graphite exhibits thorough light-proofing properties. As the color pigment, various organic pigments and inorganic pigments which are used for printing inks, paints, and the like can be used. Examples of the organic pigments include phthalocyanine pigments, insoluble azo pigments, azo lake pigments, anthraquinone pigments, quinacridone pigments, dioxazine pigments, diketopyrrolopyrrole pigments, anthrapyrimidine pigments, anthanthrone pigments, indanthrone pigments, flavanthrone pigments, perinone pigments, perillene pigments, isoindolinone pigments, and thioindigo pigments. Examples of the inorganic pigments include iron oxide, ultramarine, Prussian blue, cobalt oxide, strontium chromate, Titanium Yellow, Titanium Black, zinc chromate, iron black, Molybdenum Red, Molybdenum White, lithopone, emerald green, cadmium yellow, cadmium red, and cobalt blue. Examples of the white pigments include titanium dioxide, zinc white, calcium carbonate, kaolin clay, and barium sulfate.

As the aqueous binder which can be used for the light-proofing layer in the present invention, the conventionally and generally used binders for coating can be used, and known water-soluble high-molecular weight compounds such as polyvinyl alcohol-based resins, starches, casein, methyl cellulose, and carboxymethyl cellulose, etc. and known water-dispersible high-molecular weight compounds such as acrylic compounds, styrene-based compounds, polyester-based compounds, and vinyl acetate-based compounds, etc. can be used. Of these compounds, the water-soluble high-molecular weight compounds, particularly polyvinyl alcohol-based resins, are preferred from the viewpoint of defibration properties.

With respect to the blend of the above-described light-proofing agent with the aqueous binder, it is preferred that the amount of the aqueous binder is from 5 to 300 parts by weight based on 100 parts by weight of the light-proofing agent as a solids content. If the amount of the aqueous binder is less than 5 parts by weight based on 100 parts by weight of the light-proofing agent as a solids content, the surface strength of the light-proofing layer is so weak that problems such as dusting occur in production or in practical use. If it exceeds 300 parts by weight, the light-proofing properties expected from the coating weight can not be obtained and the cost is high. The coating weight of the light-proofing layer on the paper is preferably from 3 to 25 $g/m^2$, particularly from 5 to 20 $g/m^2$. If the coating weight is less than 3 $g/m^2$, the light-proofing properties are inferior, whereas if it exceeds 25 $g/m^2$, the costs such as those for drying capacity being high, and hence, such is disadvantageous from the standpoint of production.

As the acrylic emulsion which can be used for the moistureproof layer in the present invention, for example, copolymer emulsions such as acrylic copolymers and acrylic styrene copolymers and various emulsions such as self-cross-liking type acrylic copolymer emulsions can be used. Specific examples thereof include acrylic copolymers copolymerized with styrene, styrene derivatives, acrylic acid (methacrylic acid), acrylic acid esters such as methyl acrylate, ethyl acrylate, butyl acrylate, and 2-ethylhexyl acrylate, or methacrylic acid esters such as methyl methacrylate, ethyl methacrylate, and butyl methacrylate.

Furthermore, in the present invention, in order to obtain good defibration properties from the viewpoint of defibration properties of collection of waste papers, the gel fraction of the polymer used is preferably in the range of from 90 to 100%. If the gel fraction is less than 90%, the polymer layer forming the coated layer is soft and large in elongation at the time of defibration. This elongation works as a resisting force against the shear force to be applied at the time of defibration, although the polymer is hardly finely separated and dispersed and has defibration properties, it can be hardly defibrated. If the gel fraction exceeds 90%, since the elongation of the polymer layer becomes small, the polymer can be easily separated and dispersed by the shear force to be applied at the time of defibration, and the defibration properties are good. Also, since the gel fraction is increased to make the elongation of the polymer small, it is possible to make the defibration properties good without being influenced by Tg (glass transition temperature) of the polymer.

In the present invention, film-forming assistants such as ethylene glycol monomethyl ether, ethylene glycol monoethyl ether, ethylene glycol monobutyl ether, 2,2,4-trimethylpentanediol-1,3-monobutyrate, diethylene glycol mono-tert-butyl ether, ethylene glycol monoethyl ether acetate, ethylene glycol monoisobutyl ether acetate, toluol, xylol, and terpene and plasticizers such as DPO and DBP can be used. It is particularly preferred that these compounds are used in an amount ranging from 1 to 10 parts by weight based on 100 parts by weight of the solids content of the acrylic polymers/copolymers because they do not adversely affect the qualities such as defibration properties and can improve the film formation. By using these compounds, the compounding ratio of the wax used can be decreased, advantages against the reduction of the coefficient of friction (easy for slipperiness) are obtained, the characteristic features as wrapping papers can be easily obtained, the roll stains of a paper machine are hardly generated at the time of reuse as a waste-paper stock, and good recycling properties are obtained.

With respect to the gel fraction (degree of cross-linking in the grains) of the polymer used in the present invention, those adjusted by the use of a crosslinking agent such as divinylbenzene, diallyl phthalate, allyl methacrylate, and ethylene glycol dimethacrylate or of other reaction assistants and the reaction conditions can be used, and the use thereof is not particularly limited by the production method and the like. If the Tg of the polymer is too high, the film-forming properties are inferior, whereas if it is too low, the polymer layer is so tacky that blocking and other problems are likely generated. Taking into account these matters, the use of Tg is preferably from 0 to 70° C.

As the wax-based emulsion which is used for the moistureproof layer in the present invention, known wax emulsions such as paraffin-based wax emulsions and polyethylene-based emulsions can be used. Of these are particularly preferable the paraffin-based wax emulsions because they have high water repellency and are suitable for the adjustment of the water vapor permeability. Further, in the present invention, two or more kinds of wax-based emulsions can be used to adjust. A preferred compounding ratio of the wax-based emulsion to the acrylic emulsion is from 1 to 5 parts by weight based on 100 parts by weight of the acrylic emulsion as a solids content. If the compounding ratio of the wax-based emulsion is less than 1 part by weight, good moistureproof properties are not obtained. On the other hand, as the compounding ratio of the wax increases, the roll stains of a paper machine at the time of reuse as a waste-paper stock are likely generated. However, if the compounding ratio of the wax-based emulsion is less than 5 parts by weight, the roll stains are not substantially generated, and the paper-making properties are not adversely affected. In addition, as the compounding ratio of the wax-based emulsion increases, the coating layer becomes very brittle, and the moistureproof properties at the time of folding are greatly reduced. Also, the coefficient of friction is reduced due to the presence of the wax so that troubles likely occur. However, if the compounding ratio of the wax-based emulsion is, as a matter of course, 5 or less parts by weight and even 10 or less parts by weight, these qualities are not adversely affected. The coating weight of the moistureproof layer on a paper is good from 3 to 25 g/m$^2$ as a solids content and in particular, from 5 to 20 g/m$^2$ is preferable. If the coating weight is less than 3 g/m$^2$, the qualities such as moistureproof properties and heat-sealing properties are inferior. If it exceeds 25 g/m$^2$, the costs for drying capacity, etc. are so high that there are disadvantages from the standpoint of production.

In the present invention, in order to further improve the antislipping properties, etc. of the coated surface, if desired, the coating color used for the moistureproof layer can be appropriately compounded with an inorganic pigment such as calcium carbonate, titanium oxide, talk, kaolin, zinc oxide, aluminum hydroxide, and magnesium carbonate, etc. A suitable amount of the inorganic pimgent is from 0.1 to 20 parts by weight based on 100 parts by weight of the acrylic emulsion as a solids content.

While the coated base paper which is used in the present invention is not particularly limited, and generally papers can be used, papers having a surface with high smoothness and density and papers having a high surface sizing degree are preferred.

As the coating method, general coating methods using a bar coater, an air knife coater, a blade coater, a roll coater, etc. can be used.

Further, while the drying temperature is not particularly limited, the melting point of the wax used in the moistureproof layer or higher temperatures are preferred. Taking into account the drying time, the experience shows that if the drying is carried out at a temperature of from 70 to 150° C., the above-described effects can be achieved.

In the present invention, for example, the constructions as shown in FIGS. 1 to 3 are obtained depending on the manner for providing the above-described light-proofing layer and the above-described moistureproof layer.

THE PREFERRED EXAMPLE OF THE INVENTION

Figure 1:
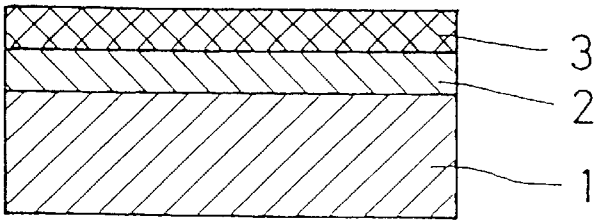
FIG. 1 is a partial cross-sectional view of one example of a moistureproof paper having light-proofing properties and recycling properties according to the present invention.
Figure 2:
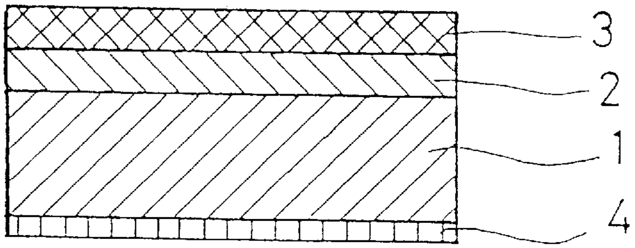
FIG. 2 is a partial cross-sectional view of another example of a moistureproof paper having light-proofing properties and recycling properties according to the present invention.
Figure 3:
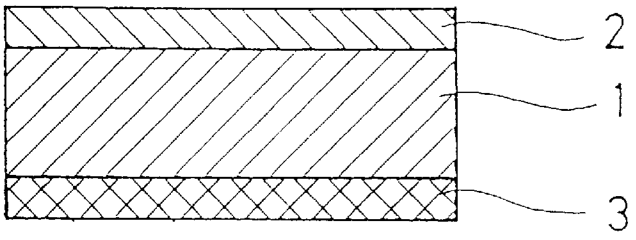
FIG. 3 is a partial cross-sectional view of a still another example of a moistureproof paper having light-proofing properties and recycling properties according to the present invention.

In FIG. 1, numericals 1, 2 and 3 show a coated base paper, a light-proofing layer, and a moistureproof layer, respectively. In the construction shown in FIG. 1, the surface of the base paper opposite to the coated surface provided with the light-proofing layer and the moistureproof layer can be coated by using known materials such as antislipping agent or antislipping agent-containing polyvinyl alcohol-based resins, and starches for the purposes of imparting antislipping properties, preventing curling, etc., as shown in FIG. 2. In FIG. 2, numerical 4 shows an antislipping coating. FIG. 3 is a cross-sectional view to show a moistureproof paper having light-proofing properties and recycling properties according to the present invention, in which on a paper support comprising a coated base paper having a light-proofing layer provided thereon, a moistureproof layer is provided on the base paper surface opposite to the side of the light-proofing layer. Since the moistureproof layer is colorless and transparent, the surface color of such a moistureproof paper having light-proofing properties and recycling properties according to the present invention is the surface color of the light-proofing layer having such a hue that the luminosity index L* is from 25 to 70. Alternatively, since the coated base paper is not particularly limited, the surface color of the moistureproof paper according to the present invention is substantially the surface color of the base paper having a pale color such as white, yellow, and kraft colors. In addition, in the case that the antislipping coatings 4 are provided as shown in FIG. 2, the surface color of the moistureproof paper according to the present invention is substantially colorless and transparent or white such that the printing or letter printing can be carried out, or distinction can be made.

In the thus obtained moistureproof paper having light-proofing properties and recycling properties according to the present invention, since neither aluminum foil nor polyolefin-based resin are laminated, a mixed solution of a light-proofing agent containing graphite, a color pigment, and a white pigment as major components with an aqueous binder is used in the light-proofing layer, and a mixed coating color containing an acrylic emulsion with a wax-based emulsion having defibration properties after coating and drying is used in the moistureproof layer to achieve coating of the paper surface, the coated base paper and the coated layer can be defibrated and dispersed only with water at the time of collection as waste papers. Further, since the acrylic polymer film in the moistureproof layer has a gel fraction of 90% or more, in the case that a polymer film having a small elongation is used, the moistureproof paper is readily separated and dispersed by the shear force applied at the time of defibration, can be defibrated within 15 minutes by means of a Tappi standard disintegrator, can have defibration properties comparable to non-coated papers such as PPC papers, is excellent in the collection properties of waste papers, and is practically useful. Also, since the light-proofing layer uses neither carbon black nor aluminum paste and has a surface color of the light-proofing layer having such a hue that the luminosity index L* is from 25 to 70, at the time of reuse as waste papers, the hue of the recycled papers is not substantially different from that of kraft papers, and there is no problem in the appearance in terms of commercial value. Further, if the amount of the wax-based emulsion used in the moistureproof layer is decreased, the roll stains of a paper machine are hardly generated at the time of reuse as waste papers so that the moistureproof paper is excellent in the paper-making properties of waste papers and practically useful.

In addition, the water vapor permeability and coefficient of friction can be adjusted by the compounding ratio of the wax and coating weight, and the qualities comparable to those of polyethylene-laminated papers can be obtained. Further, the moistureproof paper is imparted with a heat-sealing capacity which is one of the sealing methods, can be subjected to heat sealing at a low temperature as compared with generally and widely used polyethylene-laminated papers, and is advantageous from the standpoint of the cost for wrapping. For these reasons, there is no need to undergo the conventional sealing by using adhesives such as polyvinyl acetate or adhesive tapes such as gummed tapes, etc. and hence, the practically useful reuse can be smoothly carried out.

The present invention is hereunder described in more detail with reference to the Examples and Comparative Examples, but it is not to be construed that the present invention is limited thereto. In the following Examples and Comparative Examples, each of the light-proofing agents was prepared by dispersing 60% by weight of a pigment component having a compounding ratio (% by weight) as shown in Table 1, 22% by weight (solids content: 31%) of a styrene/acrylic resin (trade name: Joncryl 61J, manufactured by Johnson Polymer Co.) as a dispersing agent, and 18% by weight of water in a sand mill. Also, the Tg (glass transition temperature) of each of polymers of the emulsions shows a catalog value (theoretical value) of each manufacturer. Also, the hue of each of the light-proofing layers surfaces of the Examples and Comparative Examples is shown in Table 2; the results in the light-proofing properties, moistureproof properties (water vapor transmission rate:), heat-sealing properties, defibration properties, and recycling properties are shown in Table 3; and the results in the coefficient of friction are shown in Table 4, respectively.

EXAMPLE 1

A light-proofing agent 1 comprising a pigment component containing 17% by weight of graphite (trade name: CX-600, manufactured by Chuetsu Kokuen Kogyosho K. K.), 50% by weight of red oxide (trade name: EP-40, manufactured by Nippon Bengara Kogyo K. K.) as a color pigment, and 33% by weight of titanium dioxide (trade name: Tipaque R-930, manufactured by Ishihara Sangyo Co., Ltd.) as a white pigment was mixed with polyvinyl alcohol (trade name: PVA 117, manufactured by Kuraray Co., Ltd.) in such a manner that a ratio of the light-proofing agent to PVA is 100:20 as a solids content, to prepare a coating color having a solids content of 30%. The thus obtained coating color was coated on a kraft paper of 75 $g/m^2$ by means of an air knife coater, followed by drying to obtain a paper support provided with a light-proofing layer having a coating weight of 10.5 $g/m^2$. The hue of the thus obtained light-proofing layer surface was brownish, in which the luminosity index $L^*$ is 30, as shown in Table 2, and it was possible to undergo printing or letter printing using a black ink, and the printing or letter printing patterns could be thoroughly distinguished.

Subsequently, a styrene/acrylic emulsion having a gel fraction of polymer of 98% (trade name: Saivinol X-591-607E-17, manufactured by Saiden Chemical Co., Ltd., Tg: 20° C.) was mixed with a wax-based emulsion (trade name: Saivinol X-591-607E-18, manufactured by Saiden Chemical Co., Ltd.) in such a manner that a ratio of 100:4 (acrylic resin: the wax) as a solids content, to prepare a coating color having a solids content of 40%. The thus obtained coating color was coated on the light-proofing layer of the above-described paper support by means of an air knife coater, followed by drying to obtain a moistureproof paper provided with a moistureproof layer having a coating weight of 12.6 $g/m^2$.

As shown in Table 3, the thus obtained moistureproof paper was very good in the light-proofing properties, moistureproof properties, and heat-sealing properties. Also, when the defibration properties were evaluated by means of a Tappi standard disintegrator, the moistureproof paper became completely in a single fiber state within 13 minutes and was very good. Further, the elongation at breaking point of the polymer film which is greatly related to the defibration properties was measured to be 62%. These results showed that the defibration properties of the moistureproof paper of the present invention are substantially comparable to those of the noncoated papers because the time required for defibration of the kraft paper as a coated base paper was 8 minutes, and the time required for defibration of the PPC paper as a representative of non-coated papers was 10 minutes. Also, when the evaluation was made by preparing a recycled paper (hand-made paper) by using a paper stock obtained through the evaluation of the defibration properties with respect to the recycling properties, no stains of a cylinder dryer at the time of drying generated. Further, as the results obtained by observing the surface of the obtained recycled paper, the brownish light-proofing layer as shown in Table 2 was finely dispersed in the paper, the hue of the recycled paper was substantially comparable to the hue of the kraft base paper, and the recycled paper involved no problem in appearance in terms of commercial value. These results prove that the reuse of waste papers is extremely practically useful.

EXAMPLE 2

A moistureproof paper was prepared in exactly the same manner as in Example 1, except that the coating weight of the moistureproof layer of Example 1 was changed from 12.6 $g/m^2$ to 15.6 $g/m^2$. As shown in Table 3, the thus obtained moistureproof paper was good in the light-proofing properties, moistureproof properties, heat-sealing properties, defibration properties, and recycling properties. Also, by increasing the coating weight of the moistureproof layer as compared with that in Example 1, a lower water vapor transmission rate could be obtained.

EXAMPLE 3

A moistureproof paper was prepared in exactly the same manner as in Example 1, except that the acrylic emulsion and the wax-based emulsion used in Example 1 were mixed in such a manner that a ratio of 100:2 (acrylic resin: the wax) as a solids content. As shown in Table 3, the thus obtained moistureproof paper was good in the light-proofing properties, moistureproof properties, heat-sealing properties, defibration properties, and recycling properties.

Also, by reducing the compounding ratio of the wax as compared with that in Example 1, the coefficient of friction could be increased as shown in Table 4.

EXAMPLE 4

A moistureproof paper was prepared in exactly the same manner as in Example 1, except that the light-proofing agent 1 and the polyvinyl alcohol used in Example 1 were mixed in such a manner that a ratio of 100:100 (=light-proofing agent: PVA) as a solids content. As shown in Table 3, the thus obtained moistureproof paper was good in the light-proofing properties, moistureproof properties, heat-sealing properties, defibration properties, and recycling properties. Also, by increasing the compounding ratio of the polyvinyl alcohol as compared with that in Example 1, not only the hue of the light-proofing layer surface could be made brighter, but also the hue of the defibrated and recycled paper could be made closer to the hue of the kraft base paper, as shown in Table 2.

EXAMPLE 5

A moistureproof paper was prepared in exactly the same manner as in Example 1, except that the light-proofing agent 1 used in Example 1 was replaced by a light-proofing agent 2 prepared by changing the mixing ratio of the graphite to the color pigment to the white pigment in the pigment component of the light-proofing agent 1 to 15:45:40 (=graphite: color pigment: white pigment) on a weight basis. As shown in Table 2, the hue of the thus obtained light-proofing layer surface was brownish, in which the luminosity index L* is 53, and brighter than that in Example 1, and the printability or letter printability with a black ink was good. Also, as shown in Table 3, the thus obtained moistureproof paper was good in the light-proofing properties, moistureproof properties, heat-sealing properties, defibration properties, and recycling properties, and the hue of the defibrated and recycled paper was close to the hue of the kraft base paper as compared with that in Example 4.

EXAMPLE 6

A moistureproof paper was prepared in exactly the same manner as in Example 1, except that the acrylic emulsion and the wax-based emulsion used in Example 1 were mixed in such a manner that a ratio of 100:10 (=acrylic resin: the wax) as a solids content. As shown in Table 3, the thus obtained moistureproof paper was good in the light-proofing properties, moistureproof properties, heat-sealing properties, and defibration properties. Also, with respect to the recycling properties, at the time of drying by a cylinder dryer in the preparation of the defibrated and recycled paper, roll stains by the wax component were slightly observed, a level of which was, however, of no problem in the drying step of paper making, and the hue of the defibrated and recycled paper was good as in Example 1. As shown in Table 4, by increasing the compounding ratio of the wax as compared with that in Example 1, the coefficient of friction was slightly low.

EXAMPLE 7

A moistureproof paper was prepared in exactly the same manner as in Example 1, except that the acrylic emulsion and the wax-based emulsion used in Example 1 were replaced by a styrene/acrylic emulsion having a gel fraction of polymer of 13% (trade name: Newcoat S-3300, manufactured by Shin-Nakamura Kagaku Kogyo K. K., Tg: 10° C.) and a wax-based emulsion (trade name: WEL-2, manufactured by Konishi K. K.), respectively. As shown in Table 3, the thus obtained moistureproof paper was good in the light-proofing properties, moistureproof properties, and heat-sealing properties. Also, though this moistureproof paper had defibration properties, it took a time of defibration of 60 minutes until it became completely in a single fiber state and was hardly defibrated as compared with that in Example 1. The elongation at breaking point of the polymer film which is related to the defibration properties was measured to be 504%, the value of which was, for example, about 7 times the value of 62% which is the elongation at breaking point of the polymer film having good defibration properties in Example 1. Accordingly, it can be considered that this great elongation resisted the shear force at the time of defibration so that the moistureproof paper prepared was hardly separated and dispersed. The recycling properties after the defibration were good as shown in Table 3.

Comparative Example 1

A moistureproof paper was prepared in exactly the same manner as in Example 1, except that the light-proofing agent 1 used in Example 1 was replaced by a light-proofing agent 3 prepared by changing the mixing ratio of the graphite to the color pigment to the white pigment in the pigment component of the light-proofing agent 1 to 10:5:85 on a weight basis. As shown in Table 2, the hue of the thus obtained light-proofing layer surface was brownish, in which the luminosity index L* is 78, and brighter than that in Example 5, and the printability or letter printability with a black ink was good. Also, as shown in Table 3, though the thus obtained moistureproof paper was good in the moistureproof properties, heat-sealing properties, defibration properties, and recycling properties, it was inferior in the light-proofing properties.

Comparative Example 2

A moistureproof paper was prepared in exactly the same manner as in Example 1, except that carbon black (trade name: EM BLACK K-14, manufactured by Toyo Ink Manufacturing Co., Ltd.) was used in place of the light-proofing agent 1 used in Example 1. As shown in Table 3, the thus obtained moistureproof paper was good in the light-proofing properties, moistureproof properties, heat-sealing properties, and defibration properties. However, since the hue of the thus obtained light-proofing layer surface was black as shown in Table 2, the printing or letter printing patterns were hardly distinguished, and this moistureproof paper was inferior in the printability or letter printability. Also, the results of the observation of the surface of the defibrated and recycled paper revealed that the black light-proofing layer remained in a dispersed state on the surface and that the hue was greatly darkened as compared with the kraft base paper and hence, the recycling properties were inferior.

Comparative Example 3

A moistureproof paper was prepared in exactly the same manner as in Example 1, except that an aluminum paste (trade name: Alumipaste 1110W, manufactured by Showa Aluminum Powder Co., Ltd.) was used in place of the light-proofing agent 1 used in Example 1. As shown in Table 3, the thus obtained moistureproof paper was good in the light-proofing properties, moistureproof properties, heat-sealing properties, and defibration properties. However, the results of the observation of the surface of the defibrated and recycled paper revealed that the aluminum powder having the same color as in the light-proofing layer surface shown in Table 2 stood out on the surface and that the appearance changed more than in the difference in the hue from the kraft base paper and hence, the recycling properties were inferior.

Comparative Example 4

A moistureproof paper was prepared in exactly the same manner as in Example 1, except that a coating color prepared by appropriately diluting a printing ink containing Benzidine Yellow (trade name: TK Hi-Echo Yellow M, manufactured by Toyo Ink Manufacturing Co., Ltd.) with a solvent (trade name: NC102, manufactured by Toyo Ink Manufacturing Co., Ltd.) was used in place of the mixed coating color of the light-proofing agent 1 with PVA as used in Example 1 and coated on a kraft paper of 75 g/$m^2$ by means of a Meyer bar, followed by drying to obtain a paper support provided with a light-proofing layer having a coating weight of 13.0 g/$m^2$. As shown in Table 3, the thus obtained moistureproof paper was good in the moistureproof properties, heat-sealing properties, and defibration properties. Also, as shown in Table 2, the hue of the light-proofing layer surface was yellowish, and the printability or letter printability with a black ink was good. Further, the results of the observation of the surface of the defibrated and recycled paper revealed that though the surface was greatly changed yellow, there was no problem in appearance in terms of commercial value. However, though the light-proofing properties against lights in a wavelength region ranging from 200 to 500 nm were good, those in a wavelength region ranging from 500 to 800 nm were substantially equal to those of the kraft base paper and hence, were not satisfactory.

Comparative Example 5

Figure 4:
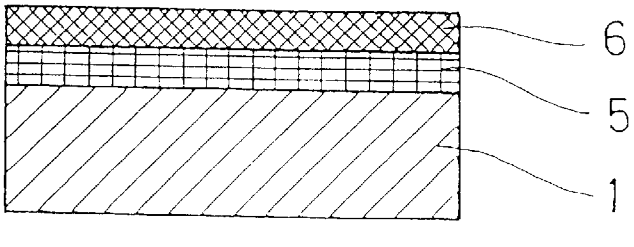
FIG. 4 is a partial cross-sectional view of the conventional moistureproof paper having light-proofing properties provided with an aluminum foil layer and a polyethylene laminate layer.

The same respective measurements were carried out with respect to an aluminum kraft paper (a wrapping paper for PS printing plates manufactured by Fuji Photo Film Co., Ltd., refer to FIG. 4) which is prepared by laminating a 7 μm-thick aluminum foil on a polyethylene laminate surface of a polykraft paper comprising a kraft paper of 83 g/$m^2$ having a 10 μm-thick polyethylene film laminated thereon. As shown in Table 3, the aluminum kraft paper was good in the light-proofing properties and moistureproof properties. However, this aluminum kraft paper had no heat-sealing properties, and with respect to the defibration properties, aggregates of polyethylene, aluminum, and fibers were observed even after the defibration for 60 minutes and hence, it was confirmed that the aluminum kraft paper was inferior in the defibration properties.

TABLE 1

| Light-Proofing Agent | Graphite | Color Pigment | White Pigment |
|---|---|---|---|
| 1 | 17 | 50 | 33 |
| 2 | 15 | 45 | 40 |
| 3 | 10 | 5 | 85 |

TABLE 2

| Sample | Hue of Light-Proofing Layer Surface L* | a* | b* |
|---|---|---|---|
| Example 1 | 29.8 | 2.7 | 4.5 |
| Example 2 | 30.6 | 2.6 | 4.5 |
| Example 3 | 29.2 | 2.5 | 4.8 |
| Example 4 | 34.4 | 1.8 | 3.9 |
| Example 5 | 52.6 | 5.9 | 9.9 |
| Example 6 | 31.5 | 2.6 | 4.4 |
| Example 7 | 30.8 | 2.3 | 4.5 |
| Comparative Example 1 | 78.4 | 3.4 | 9.4 |
| Comparative Example 2 | 19.5 | −0.3 | −0.4 |
| Comparative Example 3 | 86.5 | −0.4 | 0.5 |
| Comparative Example 4 | 56.2 | 6.0 | 32.6 |

TABLE 3

| Sample | Coating Weight of Light-Proofing Layer (g/$m^2$) | Light Transmittance (%) 200 to 500 nm | 500 to 800 nm | Coating Weight of Moistureproof Layer (g/$m^2$) | WVTR (g/$m^2$/24 hr) | Amount of Heat for Heat-Sealing Moistureproof/Moistureproof*1 | Moistureproof/Base paper*1 | Defibration Time (min.) | Wax Stain on Drum Mirror at the Time of Drying | Color Difference ΔL* | Δa* | Δb* |
|---|---|---|---|---|---|---|---|---|---|---|---|---|
| Example 1 | 10.5 | ≦0.5 | ≦0.5 | 12.6 | 21.4 | 80° C.*5 sec. | 120° C.*5 sec. | 13 | Nil | 5.7 | 1.8 | 3.8 |
| Example 2 | 10.5 | ≦0.5 | ≦0.5 | 15.6 | 11.8 | 80° C.*5 sec. | 120° C.*5 sec. | 13 | Nil | 5.4 | 1.9 | 3.3 |
| Example 3 | 10.5 | ≦0.5 | ≦0.5 | 13.0 | 39.8 | 80° C.*5 sec. | 120° C.*5 sec. | 13 | Nil | 5.1 | 1.9 | 3.3 |
| Example 4 | 10.3 | ≦0.5 | ≦0.5 | 12.5 | 21.2 | 80° C.*5 sec. | 120° C.*5 sec. | 13 | Nil | 3.0 | 0.9 | 2.0 |
| Example 5 | 10.5 | ≦0.5 | ≦0.5 | 12.7 | 21.0 | 80° C.*5 sec. | 120° C.*5 sec. | 13 | Nil | 2.1 | 0.7 | 1.4 |
| Example 6 | 10.5 | ≦0.5 | ≦0.5 | 12.6 | 19.7 | 80° C.*5 sec. | 120° C.*5 sec. | 13 | Slightly observed | 5.4 | 1.4 | 3.5 |
| Example 7 | 10.5 | ≦0.5 | ≦0.5 | 12.9 | 19.8 | 90° C.*5 sec. | 80° C.*3 sec. | 60 | Nil | 5.7 | 1.8 | 3.6 |

TABLE 3-continued

| Sample | Coating Weight of Light-Proofing Layer (g/m²) | Light Transmittance (%) 200 to 500 nm | Light Transmittance (%) 500 to 800 nm | Coating Weight of Moisture-proof Layer (g/m²) | WVTR (g/m²/24 hr) | Amount of Heat for Heat-Sealing Moistureproof/Moistureproof*1 | Amount of Heat for Heat-Sealing Moistureproof/Base paper*1 | Defibration Time (min.) | Wax Stain on Drum Mirror at the Time of Drying | Color Difference ΔL* | Color Difference Δa* | Color Difference Δb* |
|---|---|---|---|---|---|---|---|---|---|---|---|---|
| Comparative Example 1 | 10.6 | 1.5 | 12.0 | 12.7 | 21.4 | 80° C.*5 sec. | 120° C.*5 sec. | 13 | Nil | −1.2 | 1.0 | 1.4 |
| Comparative Example 2 | 12.2 | ≦0.5 | ≦0.5 | 12.6 | 22.0 | 80° C.*5 sec. | 120° C.*5 sec. | 13 | Nil | 12.9 | 3.9 | 8.3 |
| Comparative Example 3 | 12.1 | ≦0.5 | ≦0.5 | 12.7 | 21.6 | 80° C.*5 sec. | 120° C.*5 sec. | 13 | Nil | −3.2 | 4.1 | 8.4 |
| Comparative Example 4 | 13.0 | 0.5 | 26.5 | 12.7 | 24.3 | 80° C.*5 sec. | 120° C.*5 sec. | 13 | Nil | −1.1 | 1.3 | −12.4 |
| Comparative Example 5 | 7*2 | ≦0.5 | ≦0.5 | 10*3 | 12.1 | Impossible*4 | Impossible*4 | Impossible | — | — | — | — |

TABLE 4

| Sample | Compounding Ratio of Coating Color used in the Moistureproof Layer: Acrylic Emulsion | Compounding Ratio of Coating Color used in the Moistureproof Layer: Wax-based Emulsion | Coefficient of Friction Moistureproof/Moistureproof*1: Coefficient of Static Friction | Coefficient of Friction Moistureproof/Moistureproof*1: Coefficient of Dynamic Friction | Coefficient of Friction Moistureproof/Base Paper*1: Coefficient of Static Friction | Coefficient of Friction Moistureproof/Base Paper*1: Coefficient of Dynamic Friction |
|---|---|---|---|---|---|---|
| Example 1 | 100 | 4 | 0.70 | 0.40 | 0.68 | 0.43 |
| Example 3 | 100 | 2 | 0.92 | 0.50 | 0.80 | 0.52 |
| Example 6 | 100 | 10 | 0.62 | 0.31 | 0.61 | 0.38 |

*1In Table 3 and Table 4, the "moistureproof/moistureproof" designation shows the results of the evaluation between the moistureproof layer surface and the moistureproof layer surface, and the "moistureproof/base paper" designation shows the results of the evaluation between the moistureproof layer surface and the kraft paper surface.
*2The value shows the thickness (μm) of the aluminum foil.
*3The value shows the thickness (μm) of the polyethylene.
*4Under the conditions at 150° C. within 5 seconds, it was impossible to undergo the heat sealing.

The tests and evaluation methods used in the foregoing Examples and Comparative Examples are as follows.

(1) Hue:

The hue of the light-proofing layer surface was measured by means of an automatic color analyzer (MODEL TC-1800, manufactured by Tokyo Denshoku K. K.) and expressed in terms of L*, a* and b*.

(2) Printability or Letter Printability:

A black ink (trade name: PSW92 Black, manufactured by Toyo Ink Manufacturing Co., Ltd.) was transferred onto the light-proofing layer surface of the sample by means of a gravure printability tester (manufactured by Kumagaya Riki Kogyo K. K.), and the printing or letter printing state was visually determined.

(3) Light-proofing Properties:

The light transmitance was measured by means of a self-recording spectrophotometer (Model 330, manufactured by Hitachi, Ltd.), and its maximum value against lights of from 200 to 500 nm and from 500 to 800 nm was shown.

(4) Water Vapor Transmission Rate:

The water vapor transmission rate was measured according to the WVTR test of moistureproof wrapping materials as defined in JIS Z0208 (under constant temperature and humidity of 40° C. and 90% RH).

(5) Heat-sealing Properties:

In the case that the press pressure was set up at 1 kg/cm² by using a sealer made by Tester Sangyo K. K., the heating conditions (temperature and time) for complete sealing were measured. The heat-sealing surface of the sample was measured with respect to two kinds of the moistureproof layer surface and the moistureproof layer surface and of the moistureproof layer surface and the kraft paper surface.

(6) Defibration Properties:

By using a standard disintegrater shown in the hand-made paper preparation method for pulp testing as defined in JIS P8209 (a Tappi standard disintegrater at 3,000 rpm), waste paper having a size of about 2.5 cm in square were added to tap water at the ordinary temperature in an amount such that the pulp concentration was 3%, followed by defibration. Then, the defibration time required until the waste paper became in a pulp state in which a mass of completely single fibers was present was measured. The evaluation was visually made with respect to the fiber dispersion after the defibration and the fiber state after the hand-made sheet preparation.

(7) Elongation of Polymer Film:

A polymer film (length: 200 mm, width: 12 mm) was stretched under the conditions at 20° C. and 65% RH by means of a tensile tester, and the elongation at breaking point was measured.

(8) Gel Fraction (Degree of Crosslinking):

The measurement of the gel fraction was carried out in the following order.

①The emulsion was dried at 80° C. to prepare a polymer film.

②The polymer film whose weight had previously been measured was dipped in toluene for 2 days and then filtered by using a filter.

③After filtering, insoluble matters were dried under decompression and dried at 80° C., and the weight was then measured.

④The gel fraction was calculated in the following calculation equation.

Gel fraction (%)=(A/B)×100

A: weight of the remaining polymer after the treatment with toluene (g)

B: weight of the polymer before the treatment with toluene (g)

(9) Recycling properties:

By using the fiber dispersion after the defibration as obtained in the above-described evaluation of the defibration properties, a hand-made wet sheet was prepared, and by using a KRK rotary dryer (a standard type manufactured by Kumagaya Riki Kogyo K. K.), the wax stains on the cylinder mirror at the time of drying were visually evaluated.

The hue of the recycled paper after drying was measured by means of an automatic color analyzer (MODEL TC-1800, manufactured by Tokyo Denshoku K. K.), and the difference from the hue of the kraft paper as a coated base paper was expressed in terms of ΔL*, Δa* and Δb*.

Color difference:

ΔL*: (L* of kraft paper)−(L* of recycled paper)

Δa*: (a* of kraft paper)−(a* of recycled paper)

Δb*: (b* of kraft paper)−(b* of recycled paper)

(10) Coefficient of Friction:

The coefficient of friction was measured in accordance with the testing method of coefficient of friction of papers and boards as defined in JIS P8147. The coefficeint of friction was measured and evaluated with respect to two kinds of the moistureproof layer surface and the moistureproof layer surface and of the moistureproof layer surface and the kraft paper surface.

AVAILABILITY OF USE IN INDUSTRY

The moistureproof paper obtained according to the present invention is imparted with light-proofing properties, moistureproof and waterproof properties, and heat-sealing capacity while keeping good defibration capacity and recycling capacity and can be easily reused by utilizing the existing recycling facilities of waste papers. In particular, the moistureproof paper according to the present invention is suitable as a wrapping paper of materials requiring light-proofing properties and moistureproof properties such as light-sensitive materials, heat-sensitive recording papers, and photographic printing papers.

What is claimed is:

1. A paper support having on a surface thereof, a light-proof layer having a hue of from 25 to 70 in terms of the luminosity index L* and a light transmittance of 0.5% or less over a wavelength region ranging from 200 to 800 nm without the use of either aluminum foil or an aluminum metallized film, and a moisture-proof layer on said light-proof layer or on a surface of said paper opposite the surface coated with the light-proof layer, and said light-proof layer comprising an aqueous binder and a pigment component containing from 2 to 50% by weight of graphite, from 10 to 70% by weight of a color pigment, and from 10 to 70% by weight of a white pigment.

2. A paper as claimed in claim 1 wherein said light-proofing layer contains from 5 to 300 parts by weight of said aqueous binder based on 100 parts by weight of said pigment.

3. A moisture-proof paper in accordance with claim 1 wherein said light-proofing layer is applied in a coating weight ranging from 3 to 25 g/m$^2$.

4. A paper according to claim 1 wherein said moisture -proof layer contains from 1 to 5 parts by weight of a wax-based emulsion per 100 parts by weight of an acrylic emulsion having a gel fraction ranging from 90 to 100%.

5. The paper according to claim 1 wherein the moisture-proof layer is applied in a coating weight ranging from 3 to 25 g/m$^2$.

6. A paper according to claim 1 which includes an anti-slip coating on the surface of the paper opposite the surface containing said light-proofing and moisture-proofing layers.

* * * * *

UNITED STATES PATENT AND TRADEMARK OFFICE

CERTIFICATE OF CORRECTION

PATENT NO. : 6,117,563
DATED : September 12, 2000
INVENTOR(S) : Mitsuyuki Watanabe, et al.

It is certified that error appears in the above-identified patent and that said Letters Patent is hereby corrected as shown below:

On the title page, Item [75], the first and sixth inventor's names have been misspelled. Item [75] should read:

--[75] Inventors: Mitsuyuki Watanabe; Akiko Doujo; Ryoji Ito; Tsutomu Fujigamori; Kiyotaka Kido; Yuji Ohtake, all of Tokyo, Japan Signed and Sealed this Twenty-ninth Day of May, 2001

*Attest:*

Nicholas P. Godici

NICHOLAS P. GODICI

*Attesting Officer*

*Acting Director of the United States Patent and Trademark Office*